(12) United States Patent
Phillips et al.

(10) Patent No.: US 6,449,537 B1
(45) Date of Patent: Sep. 10, 2002

(54) ENERGY CONTROL STRATEGY FOR A HYBRID ELECTRIC VEHICLE

(75) Inventors: Anthony Mark Phillips, Northville; John Richard Blankenship; Kathleen Ellen Bailey, both of Dearborn; Miroslava Jankovic, Birmingham, all of MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/697,908

(22) Filed: Oct. 27, 2000

(51) Int. Cl.$^7$ .............................. F02N 11/06; H02P 9/04; B60K 1/00
(52) U.S. Cl. .................. 701/22; 180/65.2; 180/65.3; 290/40 A
(58) Field of Search ....................... 701/22; 180/65.2, 180/65.3, 65.4, 65.1; 290/40 A, 40 B, 40 C, 40 D, 40 R

(56) References Cited

U.S. PATENT DOCUMENTS

| | | | | |
|---|---|---|---|---|
| 4,547,678 A | * | 10/1985 | Metzner et al. | ........... 290/40 C |
| 5,791,425 A | * | 8/1998 | Yamada et al. | ............ 180/65.2 |
| 5,910,722 A | * | 6/1999 | Lyons et al. | ................ 320/104 |
| 5,936,312 A | * | 8/1999 | Koide et al. | .............. 290/40 R |
| 6,054,844 A | * | 4/2000 | Frank | .......................... 322/16 |
| 6,196,344 B1 | * | 3/2001 | Tamor | ....................... 180/65.4 |
| 6,208,034 B1 | * | 3/2001 | Yamaguchi | ............... 290/40 C |
| 6,209,672 B1 | * | 4/2001 | Severinsky | ............... 180/65.2 |
| 6,222,334 B1 | * | 4/2001 | Tamagawa et al. | ......... 318/376 |

* cited by examiner

*Primary Examiner*—Tan Nguyen
*Assistant Examiner*—Dalena Tran
(74) *Attorney, Agent, or Firm*—Carlos L. Hanze

(57) ABSTRACT

An energy control strategy (10) for a hybrid electric vehicle that controls an electric motor during bleed and charge modes of operation. The control strategy (10) establishes (12) a value of the power level at which the battery is to be charged. The power level is used to calculate (14) the torque to be commanded to the electric motor. The strategy (10) of the present invention identifies a transition region (22) for the electric motor's operation that is bounded by upper and lower speed limits. According to the present invention, the desired torque is calculated by applying equations to the regions before, during and after the transition region (22), the equations being a function of the power level and the predetermined limits and boundaries.

28 Claims, 2 Drawing Sheets

| State | Output |
|---|---|
| CHARGE | CHARGE_CMD = min(CHARGE_MAX, [CHARGE_MAX/(SOC_CHARGE_ON -SOC_CHARGE_OFF)] *(SOC-SOC_CHARGE_OFF))<br><br>if SA_SPEED < CHARGE_RPM_LL then<br>  TQ_SA_BC = max(LOW_RPM_CHARGE_TQ, -CHARGE_CMD/(SA_SPEED))<br>elseif SA_SPEED > CHARGE_RPM_UL<br>  TQ_SA_BC = -CHARGE_CMD/(SA_SPEED*)<br>else<br>  TQ_SA_BC = max((-CHARGE_CMD /(CHARGE_RPM_UL)-LOW_RPM_CHARGE_TQ) *(SA_SPEED-CHARGE_RPM_LL)/(CHARGE_RPM_UL -CHARGE_RPM_LL)+LOW_RPM_CHARGE_TQ, -CHARGE_CMD/(SA_SPEED))<br>endif |
| BLEED | BLEED_CMD = [BLEED_MAX/(100 -SOC_BLEED_OFF)] *(SOC-SOC_BLEED_OFF)<br><br>if SA_SPEED < BLEED_RPM_LL then<br>  TQ_SA_BC = min(LOW_RPM_BLEED_TQ,BLEED_CMD/ (SA_SPEED*)<br>elseif SA_SPEED > BLEED_RPM_UL<br>  TQ_SA_BC = BLEED_CMD/(SA_SPEED)<br>else TQ_SA_BC = min((BLEED_CMD/(BLEED_RPM_UL) -LOW_RPM_BLEED_TQ)*(SA_SPEED-BLEED_RPM_LL) /(BLEED_RPM_UL-BLEED_RPM_LL) +LOW_RPM_BLEED_TQ, BLEED_CMD/(SA_SPEED))<br>endif |

FIG. 3

ENERGY CONTROL STRATEGY FOR A HYBRID ELECTRIC VEHICLE

This application is cross-referenced to a related application being filed concurrently herewith and having Ser. No. 09/697,907.

This invention was made with Government support under Prime Contract No. DE-AC36-83CH10093 awarded by the Department of Energy. The Government has certain rights in the invention.

TECHNICAL FIELD

The present invention relates generally to an energy control system for a hybrid electric vehicle and more particularly to a system and method for controlling an electric motor and engine during bleed and charge states of a parallel hybrid electric vehicle.

BACKGROUND OF THE INVENTION

A hybrid electric vehicle has a propulsion system that consists of at least one electric motor that is utilized in some form with another power source. Most often the other power source is a gasoline or diesel engine.

Typically, the two power sources are configured in one of two ways, series and parallel. In a series hybrid the traction force to the vehicle's wheels is provided strictly by the electric motor. Electric energy is stored in a battery and is used to power the motor whenever demanded by the driver. The other power source, i.e. an engine, is used to maintain the level of energy stored in the battery at a level that is adequate to supply power to the electric motor as needed. In a series hybrid the engine is not used to provide direct motive force to the wheels based on driver demand. All of the energy from the engine is stored in the battery, where it is used by the electric motor to propel the vehicle.

In a parallel hybrid, both the engine and the motor can be directly coupled to the vehicle's wheels, so that both power sources can, independently, provide motive force for the vehicle. It should be noted that in a parallel hybrid, the engine is sometimes used to recharge the battery that supplies the motor, just as in a series hybrid.

In a specific configuration of a parallel hybrid, the motor only provides positive torque when it is used to boost the torque from the engine. This configuration requires far less energy from the battery and is often referred to as a Low Storage Requirement (LSR) architecture.

Bleed and Charge states of operation for a hybrid electric vehicle occur during periods when the battery's state of charge (SOC) is regulated to a desired level. If the SOC is higher than a predetermined calibrated level, the electric motor is commanded to operate in a motoring state, which drains the battery of excess charge and returns it to an optimal SOC. This is known as the Bleed state.

When the SOC is lower than a predetermined calibrated level, the electric motor is commanded to operate in a generating mode. The result is a recharging of the battery to optimal SOC levels, also known as the Charge state.

SUMMARY OF THE INVENTION

It is an object of the present invention to implement fundamental functions of a parallel hybrid electric vehicle. It is another object of the present invention to provide an energy control system for implementing the functions of a parallel hybrid electric vehicle.

It is a further object of the present invention to provide an algorithm for controlling the Bleed and Charge states of a hybrid electric vehicle. It is still a further object of the present invention to generate torque commands to the electric motor that drive the battery to operate at optimal state of charge (SOC) levels. It is yet a further object of the present invention to make the CHARGE/BLEED hybrid operating modes transparent to the driver.

In carrying out the above objects and other objects and features of the present invention, an algorithm is provided as part of a code for an overall Vehicle System Controller (VSC) that controls an electric motor and engine. The algorithm of the present invention generates torque commands to an electric motor that drives a battery to operate at optimal SOC levels. The particular implementation of the electric motor control in order to supply a commanded torque is application specific and will not be discussed herein. The algorithm of the present invention is part of the control code used to command torque values to the electric motor in order to operate the electric motor/internal combustion engine during Bleed and Charge states in a manner that is transparent to an operator of the electric vehicle.

According to the present invention, the algorithms for controlling Bleed and Charge states of an electric vehicle are essentially the same. The only difference lies in the sign of the commanded torque. The Bleed state has a positive torque, and the Charge state has a negative torque.

The algorithm of the present invention establishes the power level at which the battery is to be charged, or bled. Next, the algorithm calculates the torque to be commanded to the electric motor based on this power level. The present invention maintains a transparent transition during charging and/or bleeding by the way this torque command is defined as well as by compensating for the torque from the electric motor in an engine control unit (ECU). At certain motor speeds a calibrated limit is used to set the commanded torque in order to accomplish a transparent transition.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings:

FIG. 3 is a table outlining the algorithm of the present invention for the Bleed and Charge states of operation.

DETAILED DESCRIPTION OF PREFERRED EMBODIMENTS

Figure 1:
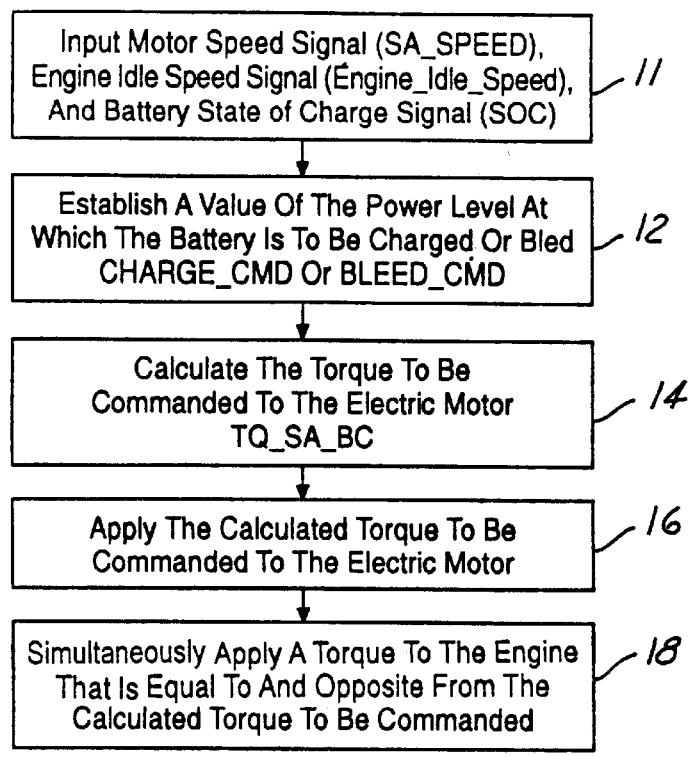
FIG. 1 is a flow chart of the present invention for the Charge and Bleed states of operation.

FIG. 1 depicts a flow diagram of the algorithm 10 of the present invention for the Charge and Bleed states for a hybrid electric vehicle. The present invention provides an energy management system, applicable to both the Charge and Bleed states, which generates the torque commands for an electric motor that drives a battery to operate at optimal state of charge, (hereinafter SOC), levels for a parallel hybrid electric vehicle. Furthermore, the present invention generates torque commands to the engine to make the Charge and Bleed states transparent to a vehicle's operator.

In the Charge state, the SOC is lower than a predetermined, calibrated level. Therefore, the electric motor is commanded to operate in a generating state, thus recharging the battery to optimal SOC levels. In the Bleed state, the SOC is higher than a predetermined, calibrated level. Therefore, the electric motor is commanded to operate in a motoring mode, draining the battery and returning it to optimal SOC levels.

The algorithm 10 has inputs 11 including the motor speed, (SA_SPEED), the engine idle speed, (Engine_Idle_Speed), and the battery state of charge (SOC). The algorithm establishes 12 a value representing the power level, in Watts, at which the battery is to be charged. This value is called CHARGE_CMD for the Charge state and BLEED_CMD for the bleed state in the present example. The power level can be a constant, or it can be a function of one or more system variables.

Determining whether a constant or variable power level should be used depends on an optimal strategy for battery charging or bleeding. There are many variations of the optimal strategy that one skilled in the art is capable of determining based on various factors associated with the particular electric motor.

In the present example, for the Charge state, CHARGE_CMD is dependent on an estimated SOC. During the Charge state, the SOC has ON and OFF boundaries that are calibrated to predetermined values called SOC_CHARGE_ON and $SOC\_CHARGE_{OFF}$. The value of CHARGE_CMD is also limited by the maximum power of the electric motor in the Charge state. In the present example, this maximum power limit is called CHARGE_MAX. Therefore, according to the present invention, CHARGE_CMD is defined as the minimum of either the maximum power limit, CHARGE_MAX, or a ratio of the maximum power limit determined by the SOC boundaries, represented by Equation (1) and also shown in FIG. 3 by reference number 38:

$$CHARGE\_MAX/(SOC\_CHARGE\_ON-SOC\_CHARGE\_OFF)*(SOC\_SOC\_CHARGE\_OFF) \quad (1)$$

Therefore, it is clear that when the battery state of charge is equal to the upper SOC boundary, the CHARGE_CMD is equal to the constant CHARGE_MAX. When the battery state of charge is equal to the lower SOC boundary, the CHARGE_CMD is zero. Anything in between is a variable CHARGE_CMD.

For the Bleed state, BLEED_CMD also has a boundary where the Bleed state is no longer necessary. This boundary is called SOC_BLEED_OFF in the present example. As in the Charge state, the boundary is calibrated. The BLEED_CMD value is limited by the maximum power in the electric motor during Bleed. This is called BLEED_MAX in the present example. The BLEED_CMD is established from a ratio of BLEED_MAX and a 100% SOC. The ratio is used to set BLEED_CMD in terms of kilowatts. As the SOC approaches the optimal value, the ratio approaches zero until it is no longer necessary to operate in the Bleed state. Equation (2) represents the BLEED_CMD and is also shown at reference number 42 in FIG. 3:

$$BLEED\_CMD=[BLEED\_MAX/(100-SOC\_BLEED\_OFF)]*(SOC-SOC\_BLEED\_OFF) \quad (2)$$

Therefore, when the battery is 100 percent charged, the BLEED_CMD is constant and equal to LEED_MAX. When the battery is something other than 100 percent charged, the BLEED_CMD is variable. When the battery state of charge is equal to the boundary, the BLEED_CMD is zero.

The CHARGE_CMD, and likewise the BLEED_CMD, corresponds to the power level requested to charge, or bleed, the battery. Therefore, the torque command to the electric motor can be calculated from this power level. Referring again to FIG. 1, the present invention calculates 14 the torque to be commanded to the electric motor based on the established power level. The calculated torque to be commanded is applied 16 to the electric motor. In another embodiment of the present invention, the calculated torque to be commanded is applied 18 to the engine in equal value and opposite sign to compensate for the change to the motor and make the CHARGE/BLEED state transparent to the driver.

In the present example, the torque to be commanded is called TQ_SA_BC. The calculation is dependent upon the motor speed, called SA_SPEED in the present example. According to the present invention, upper and lower motor speed limits for the Charge and Bleed states are predetermined and are used in the calculations for the desired torque command, TQ_SA_DES.

The motor speed, SA_SPEED, has a predetermined lower limit for the Charge state called CHARGE_RPM_LL and a predetermined lower limit for the Bleed state called BLEED_RPM_LL. The predetermined upper limits are CHARGE_RPM_UL and BLEED_RPM_UL for the Charge and Bleed states respectively. The predetermined motor speed limits reflect break points in the speed of the motor for operating states that define the boundaries for calculations used to determine the desired torque command.

For motor speeds above the predetermined upper limit, the desired torque is calculated by dividing the power level, CHARGE_CMD or BLEED_CMD, by the motor speed, SA_SPEED;

$$TQ\_SA\_BC=CHARGE\_CMD/SA\_SPEED \quad (3)$$

$$TQ\_SA\_BC=BLEED\_CMD/SA\_SPEED \quad (4)$$

It is obvious from the calculation for the desired torque, for speeds above the predetermined upper limit, that a slower speed commands a higher torque. However, internal combustion engines are usually not capable of providing high values of torque at low speeds. Therefore, the commanded torque to the motor at low speeds has to be limited. Also, the torque from the electric motor during the Charge and Bleed states has to be compensated in an Engine Control Unit for the vehicle so that the transition into the Charge and Bleed states remains transparent to the vehicle's operator. It is also necessary to limit the torque command at low speeds because, typically, the electric motor is not efficient in this region.

According to the present invention, the limited value of the commanded motor torque for low motor speeds is called LOW_RPM_CHARGE_TQ or LOW_RPM_BLEED_TQ. This limited value is a calibrated predetermined boundary that depends on the particular electric motor being used. The limited torque value is used to calculate the desired torque TQ_SA_DES for motor speeds below the lower predetermined motor speed limits of CHARGE_RPM_LL or BLEED_RPM_LL.

In order to produce a transparent transition of the engine to and from an idle speed mode, the algorithm of the present invention commands the motor torque for low motor speeds in the idle mode and for a band of speeds above idle. The band of speeds is defined by the boundaries CHARGE_RPM_LL and CHARGE_RPM_UL or BLEED_RPM_LL and BLEED_RPM_UL in the present example. These boundaries define the transitional period that must remain transparent to the vehicle's operator. The present invention defines a function having a predetermined shape that is designed to reduce engine and motor disturbances during the transition region.

As discussed above the lower and upper boundaries, (CHARGE_RPM_LL, CHARGE_RPM_UL, BLEED_RPM_LL, and BLEED_RPM_UL), are motor speeds that represent break points in the engine's operation. The breakpoints can be calculated by using a calibrated value that defines a predetermined difference in speed from engine idle speed to determine the boundaries for the transition. In the present example, these differences are called CHARGE_DELTA_LL and BLEED_DELTA_LL, which can be calibrated, thereby giving a test engineer the ability to choose the speed at which the transition from the low speed torque to the desired torque begins.

For the Charge state, the lower and upper limits for the transition are given by:

$$CHARGE\_RPM\_LL = Engine\_Idle\_Speed + CHARGE\_DELTA\_LL \quad (5)$$

$$CHARGE\_RPM\_UL = CHARGE\_RPM\_LL + CHARGE\_DELTA\_UL \quad (6)$$

For the Bleed state, the upper and lower limits are defined as:

$$BLEED\_RPM\_LL = Engine\_Idle\_Speed + BLEED\_DELTA\_LL \quad (7)$$

$$BLEED\_RPM\_UL = BLEED\_RPM\_LL + BLEED\_DELTA\_UL \quad (8)$$

Figure 2:
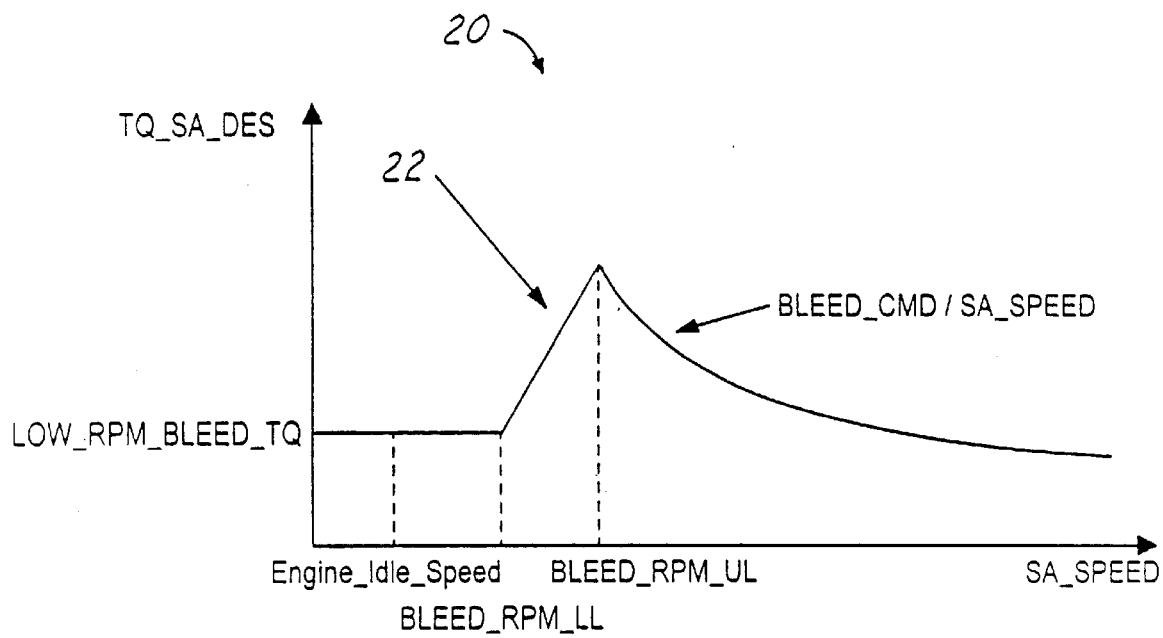
FIG. 2 is a graph depicting the lower level and upper level limits for the torque command as a function of motor speed during the Bleed state of operation.

FIG. 2 is a graphical representation of the desired torque function for the algorithm of the present invention. There is shown in FIG. 2 a plot 20 of the desired torque, TQ_SA_DES on the y-axis and the motor speed SA_SPEED on the x-axis. The plot 20 represents the torque for the Bleed state. The plot remains constant at LOW RPM_BLEED_TQ during Engine_Idle Speed until the lower limit, BLEED_RPM_LL, is reached. At that point, the transition from low to high speed occurs and the value of the desired torque is calculated as discussed above. The transition region is identified by 22 on the plot 20. After reaching the upper limit, BLEED_RPM_UL, the desired torque is calculated as BLEED_CMD/SA_SPEED.

The transition region is not necessarily linear, as shown in FIG. 2 and described hereinafter with respect to the present example. This region can be represented by many different functions, the variations of which are too numerous o discuss herein. One skilled in the art is capable of determining a function that is representative of desired motor speed in the transition region.

In the present example, the value of the desired torque in the transition region is defined as the maximum of either:

$$-(CHARGE\_CMD/(CHARGE\_RPM\_UL) - LOW\_RPM\_{CHARGE}\_TQ)*(SA\_SPEED - CHARGE\_RPM\_LL)/(CHARGE\_RPM\_UL - CHARGE\_RPM\_LL) + LOW\_RPM\_{CHARGE}\_TQ \quad (9)$$

or $$-CHARGE\_CMD/(SA\_SPEED) \quad (10)$$

The value of the desired torque in the transition region is defined as the minimum of either $$(BLEED\_CMD/(BLEED\_RPM\_UL) - LOW\_RPM\_BLEED\_TQ)*(SA\_SPEED - BLEED\_RPM\_LL)/(BLEED\_RPM\_UL - BLEED\_RPM\_LL) + LOW\_RPM\_BLEED\_TQ \quad (11)$$

or $$BLEED\_CMD/(SA\_SPEED) \quad (12)$$

FIG. 3 is a table 30 that details the algorithm of the present invention for the CHARGE and BLEED states according to the preferred embodiment of the present invention, which has a linear transition region. The column 32 represents the state of the engine, CHARGE 34, or BLEED 36. The column 34 represents the output of the algorithm.

For the CHARGE state, the CHARGE_CMD is calculated 38. The algorithm then determines 40 the applicable method for calculating the desired torque based on the relationship between the motor speed, SA_SPEED, and the lower limit of the commanded motor torque, CHARGE_RPM_LL. If the motor speed is less than the lower limit, the desired torque is calculated as the maximum of either the value of the commanded motor torque for low motor speeds and idle speeds, or the desired torque calculated by −CHARGE_CMD/SA_SPEED.

If the motor speed is greater than the lower limit of the commanded motor torque, then the desired torque is calculated as -CHARGE_CMD/SA_SPEED.

For all other situations, the motor is in a transition state, and the formula for the transition region applies as discussed above with reference to equations (9) and (10). Note that when the motor speed is equal to the boundary limits for the Charge state the desired torque is equal to

−CHARGE_CMD/SA_SPEED.

For the BLEED state, the BLEED_CMD is calculated 42. Then the algorithm determines 44 the applicable method for calculating the desired torque based on the relationship between the motor speed, SA_SPEED, and the lower limit of the commanded motor torque, BLEED_RPM_LL. IF the motor speed is less than BLEED_RPM_LL, the desired torque is the minimum of either the value of the commanded motor torque for low motor speeds and idle speeds, or the desired torque calculated by BLEED_CMD/SA_SPEED.

If the motor speed is greater than the lower limit of the commanded motor torque, then the desired torque is calculated as BLEED_CMD/SA_SPEED.

For all other situations, the motor is in a transition state, and the formula for the transition region applies as discussed above with reference to equations (11) and (12).

The linear representation for the transition region in the preferred embodiment is not the only possible representation. There are many alternatives that may be substituted. However, the upper and lower boundaries will always dictate the limits of the transition region.

The present invention controls the Bleed and Charge states of a hybrid electric vehicle by generating torque commands to the electric motor that drive the battery to operate at an optimal state of charge level. According to the present invention, the power level, which the battery is to be charged, or bled, is calculated and that value is used to calculate the torque to be commanded to the electric motor. The present invention maintains a transparent transition during charging and/or bleeding by compensating for the torque from the electric motor.

In another embodiment of the present invention, the commands generated in the vehicle system controller code must generally agree with the commands generated in an engine control unit. This maintains transparency to the driver during the CHARGE/BLEED modes. The calculated torque command is sent to the engine to either increase or decrease torque to compensate for the wheel torque and maintain the same overall torque, thereby maintaining transparency of the CHARGE/BLEED modes to the driver.

The invention covers all alternatives, modifications, and equivalents, as may be included within the spirit and scope of the appended claims.

What is claimed is:

1. An energy control strategy for a vehicle system controller for a parallel hybrid electric vehicle having an engine, a motor and a battery having bleed and charge states of operation, said energy control strategy having a measured motor speed, an engine idle speed and a battery state of charge as inputs, said control strategy comprising the steps of:

establishing a value that is representative of a power level at which the battery is to be charged, said value called CHARGE_CMD for the Charge state and further comprising:

determining a minimum of a predetermined constant power level and a variable power level having a predetermined upper boundary and a predetermined lower boundary for the charge state;

wherein when the battery state of charge is equal to said predetermined upper boundary, said variable power level is equal to said predetermined constant power level;

wherein when the battery state of charge is equal to said predetermined lower boundary, said variable power level is zero; and wherein when the battery state of charge is between said predetermined upper boundary and said predetermined lower boundary, said variable power level is given by a fraction of said predetermined constant power level;

calculating a torque to be commanded to the motor based on said value, said torque to be commanded called TQ_SA_BC; and sending said torque to be commanded to the motor.

2. The control strategy as claimed in claim 1 further comprising the step of calculating a calibrated speed limit based on the engine idle speed.

3. The control strategy as claimed in claim 2 wherein said step of calculating a calibrated speed limit further comprises the steps of:

calculating a lower speed limit; and
   calculating an upper speed limit.

4. The control strategy as claimed in claim 3 further comprising the steps of:

determining a predetermined constant torque level;
   determining a variable torque level having a predetermined upper boundary and a predetermined lower boundary for the charge state;
   calculating a lower speed limit for the Charge state defined as CHARGE_RPM_LL; and
   calculating an upper speed limit for the Charge state defined as CHARGE_RPM_UL.

5. The control strategy as claimed in claim 4 wherein said steps of calculating lower and upper speed limits for the Charge state further comprise:

setting said CHARGE_RPM_LL equal to the sum of the engine idle speed and a predetermined value defined as CHARGE_DELTA_LL; and
   setting said CHARGE_RPM_UL equal to the sum of CHARGE_RPM_LL and a predetermined value defined as CHARGE_DELTA_UL.

6. The control strategy as claimed in claim 4 wherein said step of calculating a torque to be commanded to the motor further comprises:

determining when the motor speed is greater than said upper speed limit for the Charge state; and
   said step of calculating a torque to be commanded to the motor further comprises dividing said CHARGE_CMD by the motor speed for the charge state.

7. The control strategy as claimed in claim 4 wherein said step of calculating a torque to be commanded to the motor further comprises:

determining when the motor speed is less than said lower speed limit for the Charge state; and
   said step of calculating a torque to be commanded to the motor further comprises setting the torque to be commanded equal to the maximum of either the CHARGE_CMD divided by the motor speed and a predetermined value of motor torque for low motor speeds for the Charge state.

8. The control strategy as claimed in claim 4 wherein said step of calculating a torque to be commanded to the motor further comprises:

determining when the motor speed is between said lower speed limit for the Charge state and the upper speed limit for the Charge state thereby defining a transition period; and
   defining a function to represent said transition period such that torque disturbances are reduced.

9. The control strategy as claimed in claim 8 wherein said step of defining a function further comprises the step of determining;

when the motor speed is equal to said predetermined upper boundary, whereby said variable torque level is equal to a first predetermined constant torque level;
   when the motor speed is equal to said predetermined lower boundary, whereby said variable torque level is equal to a second predetermined constant torque level; and
   when the motor speed is between said predetermined upper and lower boundaries, whereby said variable torque level is equal to a fraction of the difference between said first and second predetermined constant torque levels.

10. The control strategy as claimed in claim 9 wherein said predetermined boundary conditions for the Charge state, defined as CHARGE_RPM_UL and CHARGE_RPM_LL, are representative of instants during motor operation when torque changes take place.

11. The control strategy as claimed in claim 10 wherein said step of step of calculating a torque to be commanded to the motor further comprises;

determining when said motor is operating in said transition period; and
   setting the torque to be commanded equal to a value determined to be the maximum of either the CHARGE_CMD divided by the motor speed, SA_SPEED and a value calculated by a function representing said transition period and being bounded by said predetermined boundary conditions for the Charge state.

12. The control strategy as claimed in claim 11 wherein said function is linear.

13. An energy control strategy for a vehicle system controller for a parallel hybrid electric vehicle having an engine, a motor and a battery having bleed and charge states of operation, said energy control strategy having a measured motor speed, an engine idle speed and a battery state of charge as inputs, said control strategy comprising the steps of:

establishing a value that is representative of a power level at which the battery is to be charged, said value called CHARGE_CMD for the Charge state; and calculating a torque to be commanded based on said power level value, said torque to be commanded called TQ_SA_BC.

sending said torque to be commanded to the motor; and simultaneously sending said torque to be commanded in equal value and opposite sign to the engine.

14. The control strategy as claimed in claim 13 wherein said step of calculating a torque to be commanded further comprises establishing a constant value of said torque to be commanded.

15. The control strategy as claimed in claim 13 wherein said step of calculating a value of a torque to be commanded further comprises establishing a variable value of said torque to be commanded.

16. The control strategy as claimed in claim 13 wherein said step of establishing a value that is representative of a power level further comprises determining a minimum of a predetermined constant power level and a variable power level having a predetermined upper boundary and a predetermined lower boundary for the charge state;

wherein when the battery state of charge is equal to said predetermined upper boundary, said variable power level is equal to said predetermined constant power level;

wherein when the battery state of charge is equal to said predetermined lower boundary, said variable power level is zero; and wherein when the battery state of charge is between said predetermined upper boundary and said predetermined lower boundary, said variable power level is given by a fraction of said predetermined constant power level.

17. The control strategy as claimed in claim 13 further comprising the step of calculating a calibrated speed limit based on the engine idle speed.

18. The control strategy as claimed in claim 17 wherein said step of calculating a calibrated speed limit further comprises the steps of:

calculating a lower speed limit; and calculating an upper speed limit.

19. The control strategy as claimed in claim 18 further comprising the steps of:

determining a predetermined constant torque level;

determining a variable torque level having a predetermined upper boundary and a predetermined lower boundary;

calculating a lower speed limit for the Charge state defined as CHARGE_RPM_LL; and calculating an upper speed limit for the Charge state defined as CHARGE_RPM_UL.

20. The control strategy as claimed in claim 19 wherein said step of calculating lower and upper speed limits for the Charge state further comprises:

setting said CHARGE_RPM_LL equal to the sum of the engine idle speed and a predetermined value defined as CHARGE_DELTA_LL; and setting said CHARGE_RPM_UL equal to the sum of CHARGE_RPM_LL and a predetermined value defined as CHARGE_DELTA_UL.

21. The control strategy as claimed in claim 19 wherein said step of calculating a torque to be commanded further comprises:

determining when the motor speed is between said lower speed limit for the Charge state and the upper speed limit for the Charge state thereby defining a transition period; and defining a function to represent said transition period such that torque disturbances are reduced.

22. The control strategy as claimed in claim 21 wherein said step of defining a function further comprises the step of determining;

when the motor speed is equal to said predetermined upper boundary, whereby said variable torque level is equal to a first predetermined constant torque level;

when the motor speed is equal to said predetermined lower boundary, whereby said variable torque level is equal to a second predetermined constant torque level; and when the motor speed is between said predetermined upper and lower boundaries, whereby said variable torque level is equal to a fraction of the difference between said first and second predetermined constant torque levels.

23. The control strategy as claimed in claim 22 wherein said predetermined boundary conditions for the Charge state, defined as CHARGE_RPM_UL and CHARGE_RPM_LL are representative of instants during motor operation when torque changes take place thereby defining a transition period.

24. The control strategy as claimed in claim 22 wherein said step of step of calculating a torque to be commanded further comprises;

determining when said motor is operating in said transition period; and setting the torque to be commanded equal to a value determined to be the maximum of either the CHARGE_CMD divided by the motor speed, SA_SPEED and a value calculated by a function representing said transition period and being bounded by said predetermined boundary conditions for the Charge state.

25. The control strategy as claimed in claim 24 wherein said function is linear.

26. The control strategy as claimed in claim 18 wherein said step of calculating a torque to be commanded further comprises:

determining when the motor speed is greater than said upper speed limit for the Charge state; and said step of calculating a torque to be commanded further comprises dividing said CHARGE_CMD by the motor speed for the charge state.

27. The control strategy as claimed in claim 18 wherein said step of calculating a torque to be commanded further comprises:

determining when the motor speed is less than said lower speed limit for the Charge state; and said step of calculating a torque to be commanded further comprises setting the torque to be commanded equal to the maximum of either the CHARGE_CMD divided by the motor speed and a predetermined value of motor torque for low motor speeds for the Charge state.

28. A system for controlling a hybrid electric vehicle having an engine, a motor and a battery, said system being used during a bleed state and a charge state for the battery, said system having a measured motor speed, an engine idle speed and a battery state of charge as inputs, said system comprising:

a power level at which the battery is to be charged; and a torque to be commanded, said torque to be commanded being derived from said power level, said torque to be commanded being sent to the motor, and said torque to be commanded being simultaneously sent in equal value and opposite sign to the engine.

* * * * *